Sept. 12, 1950 S. A. JOHNSON ET AL 2,522,272
APPARATUS FOR FORMING METALLIC
FILMS ON TUBULAR CARRIERS
Filed Nov. 2, 1946 2 Sheets-Sheet 1

Inventor
Stanley A. Johnson
Hubert W. Schleuning
By
Ralph B. Stewart
Attorney

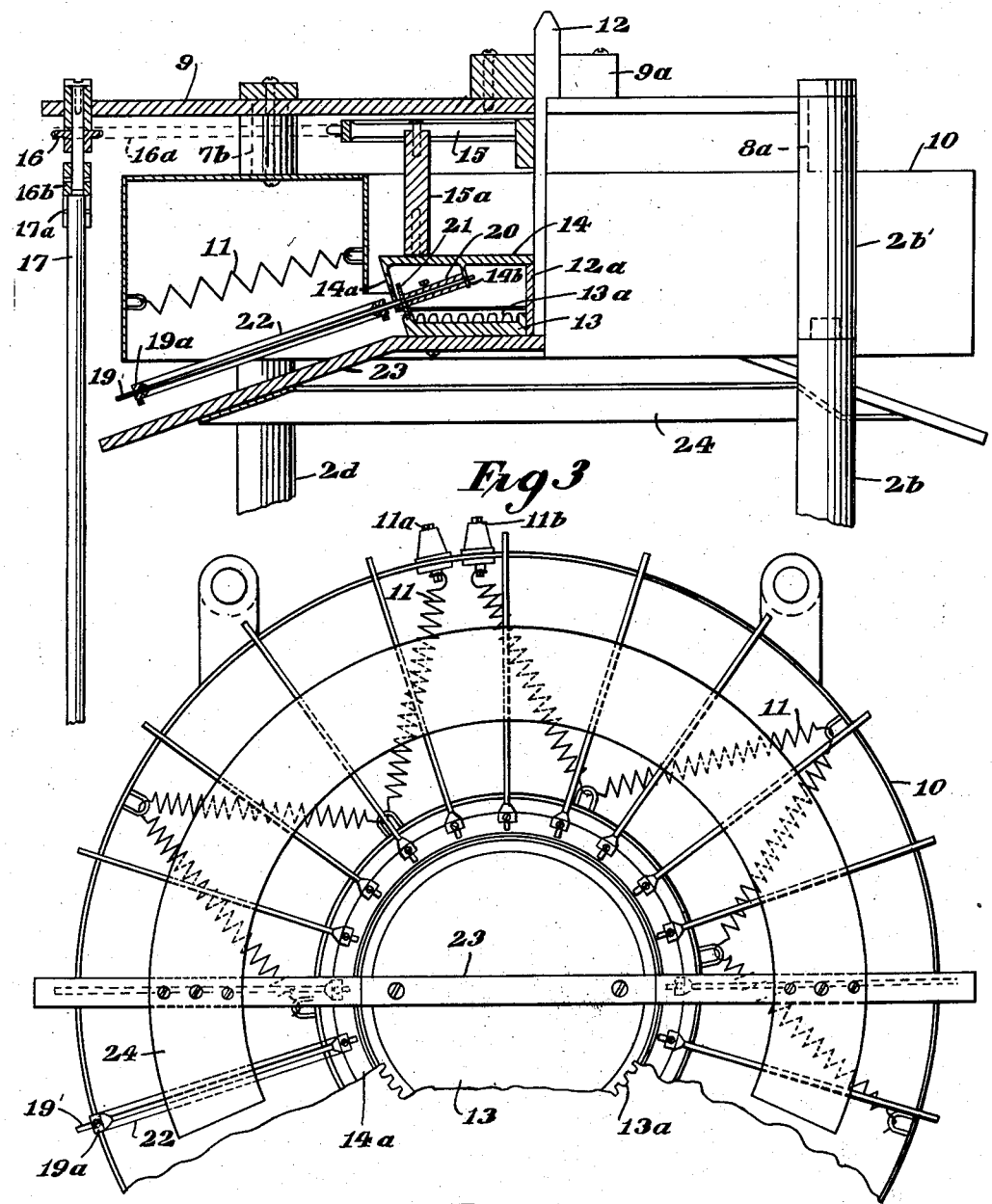

Patented Sept. 12, 1950

2,522,272

UNITED STATES PATENT OFFICE 2,522,272

APPARATUS FOR FORMING METALLIC FILMS ON TUBULAR CARRIERS

Stanley Adams Johnson, New York, and Hubert W. Schleuning, Brooklyn, N. Y., assignors to Polytechnic Institute of Brooklyn, Brooklyn, N. Y., a corporation of New York Application November 2, 1946, Serial No. 707,398

11 Claims. (Cl. 91—12.2)

This invention relates to apparatus for the formation of metallic films by thermal evaporation, and it is concerned especially with an arrangement in which metallic films are deposited upon tubular carriers.

An object of the invention is to devise an arrangement in which the film deposited on the tubular carrier is of uniform thickness around the entire cylindrical surface of the carrier.

A further object of the invention is to devise apparatus for simultaneously applying coatings to a plurality of tubular carriers in such manner that the coatings on all of the carriers will be uniform.

Another feature of the invention is to provide arrangements for securing different thickness of the coating on different areas of the carrier.

While the invention is especially designed for the formation of metallic films on tubular carriers, it may also be used for depositing films on plate-like carriers or other forms of carriers.

In depositing metallic films by thermal evaporation, it has been noted that the molecular radiation is not uniform in all directions, and where a number of objects are being coated simultaneously, the coatings on the different articles will not be exactly the same, due to difference in intensity of radiation in different directions from the vaporizing filament. This difficulty is overcome in the present invention by providing a movable carriage for supporting the insulating carriers to be coated. The movable carriage is arranged to continuously move the carriers completely around a closed path one or more times during the coating process. Thus, each carrier successively moves into the position formerly occupied by every other carrier, and there will be no variation in the coatings on the different carriers by reason of the location of the carriers at different positions with respect to the source of radiation. Preferably, the movable carriage is in the form of a rotary head arranged to move the carriers in a circular path in "merry-go-round" fashion, although the invention is not limited to this specific embodiment.

In the case of tubular carriers, the rotary carriage is also provided with rotating spindles on which the tubular carriers are mounted and are turned about their respective axes while being moved in the closed path as already described.

The preferred form of the invention is illustrated in the accompanying drawing in which Figure 1 is a plan view of the rotary head with the heat shield removed;

Figure 3 is a side elevational view, partly in section, showing the details of the rotary head on a larger scale than Figures 1 and 2; and Figure 4 is a fragmentary view showing the underside of the rotary head.

Figure 2:
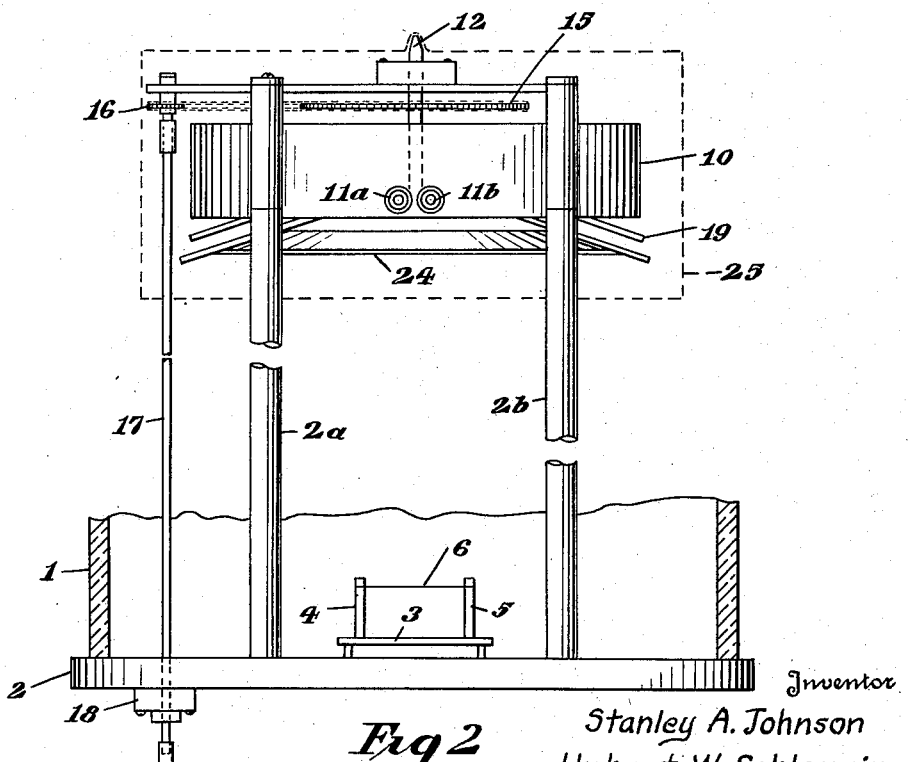
Figure 2 is a side elevational view showing the coating apparatus involving the rotary head mounted within a vacuum bell jar 1.

Referring to Figure 2 of the drawing, the evaporation apparatus illustrated is substantially the same as that shown and described in the copending application of Ernst Weber and Stanley A. Johnson entitled Formation of Metallic Films by Thermal Evaporation, filed September 26, 1946. The present invention is concerned only with that part of the evaporation apparatus which constitutes the rotary head including the arrangement selected parts of the carriers, together with the arrangement for heating the carriers during the evaporation process. The apparatus involves a glass bell jar 1 seated upon a base plate 2 which is provided with an opening at the center thereof and connected with a suitable evacuating system, not shown. Four vertical rods or standards $2a$, $2b$, $2c$ and $2d$ are mounted upon plate 2 within bell 1 and are provided with reduced extensions on their upper ends. A terminal plate 3 is mounted above the center of the base plate 2 and carries on the upper face thereof a pair of vertical terminal posts 4 and 5 between which is mounted a heater filament 6 for vaporizing the film forming material. While only one filament is shown in the drawing for the purpose of illustration, it will be understood that two or more filaments will be provided, depending upon the thickness of the film to be deposited. It is to be understood further that the filaments may be of any form such as a straight wire, several twisted wires, a basket, etc. The metal to be evaporated is carried by the filament 6, and the point from which greatest radiation takes place will be at the center of the filament.

Figure 1:
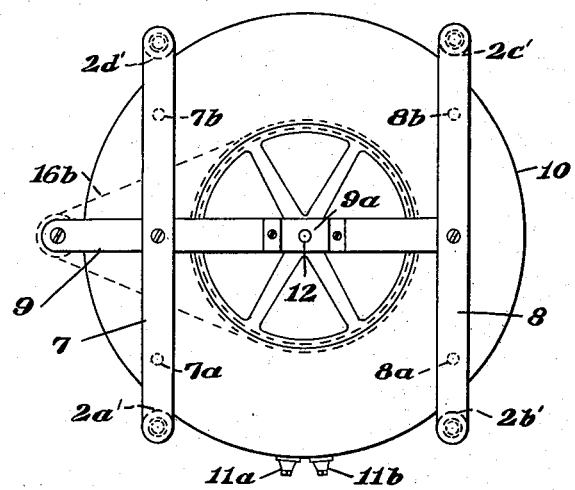

The rotary head for supporting the carriers to be coated is constructed as a unitary structure and is mounted on the upper ends of supporting rods, $2a$, $2b$, $2c$ and $2d$ and involves a supporting frame including rod extensions $2a'$, $2b'$, $2c'$, $2d'$, the lower ends of which are provided with sockets for receiving the reduced extensions on the upper ends of rods $2a$, $2b$, $2c$ and $2d$. A pair of horizontal cross-bars 7 and 8 is secured to the upper ends of rod extensions $2a'$—$2d'$ and $2b'$—$2c'$, respectively, see Figure 1, and a third cross-bar 9 is secured to bars 7 and 8, at the centers thereof, and one end extends to one side of the bar 7 as shown in Figure 1.

Supported from crossbars 7 and 8 by means of short spacers 7a, 7b, 8a and 8b is an inverted annular pan or casing 10 formed of metal, such as copper or brass. Casing 10 supports within the annular space thereof a heater wire 11 which extends around the annular part of the casing 10 in zigzag fashion and is connected to suitable insulated terminals 11a and 11b. Heater wire 11 is for the purpose of maintaining the carriers at a proper temperature during the evaporation process. A vertical rod 12 is rigidly supported in a block 9a carried by crossbar 9 and extends downwardly into the central opening in the annular casing 10. The lower end of rod 12 is provided with a fixed sleeve 12a to which is attached a circular plate 13 having gear teeth 13a formed in the edge of a conical flange at the periphery thereof. Gear 13 is held rigid and stationary by the vertical shaft 12.

The main rotary element of the movable carriage for supporting the carriers to be coated comprises a circular disk 14 journaled upon the shaft 12 and resting upon the sleeve 12a. This disk is provided with a downwardly extending conical flange 14a formed at its periphery and a second conical flange 14b of smaller diameter extends downwardly from the lower face of disk 14. This disk is driven by means of a sprocket 15 journaled on the shaft 12 below the crossbar 9. The sprocket 15 is secured to the disk 14 by means of a number of vertical spacers 15a. A smaller sprocket 16 is journaled in a bearing supported by the left end of crossbar 9 and drives the larger sprocket 15 by a chain belt 16a. The lower end of the shaft of sprocket 16 carries a slotted sleeve 16b which fits over the upper end of a driving shaft 17 having a transverse pin 17a extending into the slot of the sleeve 16b. The driving shaft 17 extends downwardly through an aperture in base plate 2 and through a vacuum-tight packing 18 mounted on the plate 2 and is driven from any suitable source of power.

A plurality of spindles 19 are journaled in holes formed near the lower edges of conical flanges 14a and 14b of rotary plate 14 as shown in Figure 3. Each spindle passes through a sleeve 20 positioned between the flanges 14a and 14b, and the sleeve is secured to the spindle by any suitable means such as the screw shown in Figure 3. The outer end of sleeve 20 carries a small spur gear 21 which meshes with the teeth 13a on the stationary gear 13. The spindles 19 extend radially beyond the edge of disk 14 and rotate below the annular heater casing 10 supporting the heater wire 11. Any suitable number of spindles may be provided, but in the arrangement illustrated in Figure 4 of the drawing twenty spindles are mounted on the rotary head. Rotation of the disk 14 about the shaft 12 causes the spindles 19 to rotate with the disk 14, and at the same time, engagement of the gears 21 with the gear 13 causes the spindles to rotate about their own axes. Only one spindle 19 has been shown in Figure 3 for the purpose of avoiding confusion in the drawing.

Each spindle is provided with a pair of removable chuck pieces 19a having oppositely facing conical ends between which the tubular carrier 22 is mounted. Only one carrier has been illustrated in Figures 3 and 4, but it will be understood that a carrier is mounted on each spindle.

In the formation of certain types of resistor elements for use as attenuators, it is desirable to produce a metallic film on the carrier in which the thickness of the film in different linear sections is not the same. For example, in producing an attenuator for a coaxial cable, the film deposited on the tubular carrier would have a central section of a certain thickness of film, and two matching sections of a greater thickness of film. For the purpose of producing metallic films of this type, the present invention involves a shield arrangement for shielding the central portion of the tubular carrier over a portion of the circular path through which the carriers travel. This shielding arrangement involves a bar 23 secured to the lower face of stationary gear 13 and having the ends thereof bent downwardly substantially parallel to the direction of spindles 19, as shown in Figure 3. Bar 23 supports an annular shield 24 which is positioned to shield the central portion of the tubular carriers 22 when the carriers pass behind the shield. As will be seen from Figure 4, the shield 24 does not extend entirely around the closed path through which the spindles move, and the central portion of the carriers are exposed to the radiation only during the time that the carriers are passing over the gap in the shield. By adjusting the extent of the gap in the shield, different thicknesses of the film may be obtained on the central portion of the carrier. It is obvious, of course, that the end sections of the tubular carriers, which are not shielded by the shield 24, are exposed at all times to the radiation and the films deposited on these sections will be thicker than the film deposited on the central section. By tapering the width of the shield, the thickness of the film deposited over the shielded portion of the carrier will vary in thickness along its length.

As shown in Figure 3, the spindles 19 are arranged at an angle to the horizontal so that the spindles are normally directed at right angles to the direction of the source of radiation. This angular positioning of the carriers is not essential, although it is desirable for obtaining the same thickness of coating at the two ends of the carrier.

In operation of the apparatus, it is desirable for best results that the rotary head should be rotated through one or more complete revolutions during the evaporation process. Very good results have been obtained in a machine where the head rotates about ten revolutions per minute and the spindles rotate on their axes at a speed of about 100 revolutions per minute. Depending upon the thickness of the film desired and the kind of material being evaporated, the entire process will take from 2 minutes to 2 hours or more. The distance of the spindles 19 from the source of radiation is not critical, and a compromise must be made between the degree of uniformity and the thickness of the film deposited in a given time. In the machine referred to above, the spindles were located about 15 inches above the vaporizing filament.

In using the apparatus, the procedure followed is substantially the same as that described in the copending application referred to above.

It is not essential that the spindles 19 be arranged radially of the rotary head, but these spindles could be arranged vertically in parallel relation, and revolving around the source of radiation. Also, while the rotary head is especially designed for use with tubular carriers, it is obvious that the head may be used as a rotating frame for supporting flat plates which would be mounted on the frame and would not rotate about individual axes.

As shown in Figure 2, an inverted cylindrical cup-shaped heat shield 25 may be arranged to cover the rotary head and to shield the bell-jar from stray radiation. The shield may be formed of sheet copper or other good shielding material.

It is also obvious that the construction of the rotary head may be reversed from that shown in the drawing, that is, disk 14 may be held stationary and provided with a circular arrangement of gear teeth, while the spindles 19 would be journaled on the disk 13, and this disk would be made rotatable by arranging shaft 12 to turn in its support. In this case, the shield supporting bar 23 would be supported independently of the shaft 12.

We claim:

1. Film forming apparatus comprising a movably mounted carriage having means thereon for supporting in a closed path a plurality of carriers to be coated, a vacuum chamber enclosing said carriage, a source of molecular radiation arranged within said chamber to simultaneously irradiate said carriers, said radiation having different intensities at different points around said path, and means for moving said carriage to cause each of said carriers to move completely around said closed path while being exposed to said radiation.

2. Apparatus according to claim 1 and including a shield mounted within said chamber, between the path of said carriers and the source of radiation, and arranged to shield selected portions of said carriers as they move around said closed path.

3. Apparatus according to claim 1 wherein said carrier supporting means extend across said path transversely of the direction of movement around said path, and including a shield mounted within said chamber between the path of said carriers and said source, and arranged to shield selected linear portions of said carriers, said shield being arranged along said closed path but having a gap therein to permit a limited coating of said shielded portions.

4. Apparatus according to claim 1 and including means embodied in said movable carriage for rotating each carrier supporting means about an individual axis simultaneously with movement thereof around said closed path.

5. In apparatus for depositing films upon carriers in which the carriers to be coated are enclosed within a bell jar having a base upon which is supported a vaporizing filament and four vertical standards surrounding the filament, the combination of a unitary carrier-supporting head removably supported on said standards comprising an annular heater casing having an open face directed downwardly, an annular heater filament supported in said casing, and a rotary carriage having its axis arranged coaxially with said heater casing and having thereon means for supporting said carriers for movement in a circular path below said annular heater casing.

6. Apparatus according to claim 5 wherein said rotary carriage comprises a rotary disk having a plurality of spindles journaled thereon and extending radially therefrom, each of said spindles being adapted to support a carrier in the form of a tubular element surrounding the spindle, and including means for rotating each spindle about its axis simultaneously with the rotation of said disk.

7. Coating apparatus according to claim 5 and including an annular shield supported below said carriage and arranged to shield selected portions of said carriers.

8. Apparatus for depositing films upon tubular carriers comprising, in combination, a base member, a vaporizing filament supported on said base member, a number of vertical standards supported on said base member surrounding said filament, a head structure mounted across the upper ends of said standards, a vertical shaft rigidly secured to said head structure and extending downwardly therefrom above said filament, a circular carriage journaled on said shaft, a plurality of spindles journaled on said carriage and extending radially therefrom, each of said spindles being provided with means for supporting a tubular carrier surrounding the spindle, and means for rotating said carrier and for simultaneously rotating said spindles about their individual axes.

9. Apparatus according to claim 8 and including an annular heater supported by said head structure and positioned above the path of travel of said spindles for heating said carriers.

10. Apparatus according to claim 8 and including an annular shield member supported from the lower end of said vertical shaft and positioned to shield selected portions of the carriers mounted on said spindles.

11. Apparatus for depositing films upon tubular carriers comprising, in combination, a base member, a vaporizing filament supported on said base member, a number of vertical standards supported on said base member surrounding said filament, a head structure mounted across the upper ends of said standards, a vertical shaft rigidly secured to said head structure and extending downwardly therefrom above said filament, a circular carriage journaled on said shaft, a plurality of spindles journaled on said carrriage and extending radially therefrom, each of said spindles being provided with means for supporting a tubular carrier surrounding the spindle, means for rotating said carrier and for simultaneously rotating said spindles about their individual axes, an annular heater supported by said head structure and positioned above the path of travel of said spindles for heating said carriers, and an annular shield member supported from the lower end of said vertical shaft and positioned to shield selected portions of the carriers mounted on said spindles.

STANLEY ADAMS JOHNSON.
HUBERT W. SCHLEUNING.

REFERENCES CITED

The following references are of record in the file of this patent:

UNITED STATES PATENTS

| Number | Name | Date |
|---|---|---|
| 331,757 | Baldwin | Dec. 8, 1885 |
| 990,645 | Engleman | Apr. 25, 1911 |
| 2,260,471 | McLeod | Oct. 28, 1941 |
| 2,369,764 | Ullrich | Feb. 20, 1945 |
| 2,380,509 | Emerson | July 31, 1945 |
| 2,398,382 | Lyon | Apr. 16, 1946 |
| 2,432,950 | Turner et al. | Dec. 16, 1947 |

Certificate of Correction

Patent No. 2,522,272 September 12, 1950

STANLEY ADAMS JOHNSON ET AL.

It is hereby certified that error appears in the printed specification of the above numbered patent requiring correction as follows:

Column 2, line 17, after the word "arrangement" insert *for driving the movable carriage, a shield for shielding*;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*